United States Patent
Cho et al.

(10) Patent No.: US 7,466,635 B2
(45) Date of Patent: Dec. 16, 2008

(54) RECORDING AND/OR REPRODUCING APPARATUS WITH OPTICAL PICKUP ACTUATOR, AND METHODS FOR SAME

(75) Inventors: Won-ik Cho, Seoul (KR); Dae-jong Jang, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 748 days.

(21) Appl. No.: 11/033,971

(22) Filed: Jan. 13, 2005

(65) Prior Publication Data

US 2005/0174901 A1 Aug. 11, 2005

(30) Foreign Application Priority Data

Jan. 13, 2004 (KR) .................... 10-2004-0002252

(51) Int. Cl.
*G11B 7/00* (2006.01)
(52) U.S. Cl. ............... 369/44.15; 369/44.14; 369/44.16
(58) Field of Classification Search .................. None
See application file for complete search history.

(56) References Cited

U.S. PATENT DOCUMENTS 7,073,185 B2 * 7/2006 Shimada et al. ............ 720/683

FOREIGN PATENT DOCUMENTS

| JP | 63-99321 | 6/1988 |
| JP | 63-168844 | 7/1988 |
| JP | 63-168845 | 7/1988 |
| JP | 04-325931 | 11/1992 |
| JP | 4-325931 | 11/1992 |
| JP | 9-134535 | 5/1997 |
| JP | 63-99321 | 6/1998 |
| JP | 2002-358675 | 12/2002 |
| JP | 2003-223730 | 8/2003 |
| KR | 2002-47190 | 6/2002 |

OTHER PUBLICATIONS

Chinese First Office Action Dated Jun. 1, 2006.
Korean Office Action for Application 10-2004-0002252.

* cited by examiner

*Primary Examiner*—Muhammad N. Edun
(74) *Attorney, Agent, or Firm*—Staas & Halsey LLP

(57) ABSTRACT

A recording/reproducing apparatus and an optical pickup actuator, and corresponding methods, for driving a bobbin in a focusing direction, a tracking direction or a tilting direction by use of a magnetic driving unit movably supported by a support member, where an object lens is mounted on the bobbin and a plurality of slits are formed on side walls of the bobbin. According to embodiments of the present invention, a secondary resonant frequency and a value of a secondary resonant peak are increased, thereby improving a gain margin.

16 Claims, 7 Drawing Sheets

RECORDING AND/OR REPRODUCING APPARATUS WITH OPTICAL PICKUP ACTUATOR, AND METHODS FOR SAME

CROSS-REFERENCE TO RELATED APPLICATIONS

This application claims the benefit of Korean Patent Application No. 2004-2252, filed on Jan. 13, 2004, in the Korean Intellectual Property Office, the disclosure of which is incorporated herein in its entirety by reference.

BACKGROUND OF THE INVENTION

1. Field of the Invention

The present invention relates to a recording/reproducing apparatus with an optical pickup actuator capable of improving a gain margin and decreasing vibration by increasing a secondary resonant frequency, such that the optical pickup actuator can be stably operated at high speed.

2. Description of the Related Art

In general, a recording/reproducing apparatus can record/reproduce information on/from a recording medium (e.g., an optical disc), and may include a pickup actuator, e.g., an optical pickup actuator moved radially in and out over the disc to radiate light onto a recording surface of the disc and receive light reflected from the recording surface.

Referring to FIGS. 1 and 2, a conventional optical pickup actuator includes a holder 13 provided on one side of a base 10, and a bobbin 17 mounted on a center of the base 10, having an object lens 15. The bobbin 17 is formed at both ends thereof with through-holes 18 extending to the object lens 15. A first magnet 20 is inserted into the respective through-holes 18, and second magnets 23 are installed at both sides of the bobbin 17. The first and second magnets 20 and 23 are respectively attached to first and second yokes 25 and 27 provided on the base 10. Also, third magnets 30 are installed along both sides of the base in a track direction T of the base. The third magnets 30 are installed in third yokes 33 provided on the base 10.

One end of the bobbin 17 is suspended and movably supported by a suspension wire 35 fixed to the holder 13.

Meanwhile, the pickup actuator includes a magnetic driving unit for driving the bobbin 17 in a focusing direction F, a tracking direction T and a tilting direction t. The magnetic driving unit has a track coil 40 wound around an inner wall of the through-hole 18 of the bobbin 17, a focus coil 43 wound around an outer periphery of the through-hole 18, at bobbin portion 17b, and tilt coils 45 wound around both sides of the bobbin 17, at bobbin portion 17a, in the tracking direction T, in addition to the respective first through third magnets 20, 23 and 30.

When the focus coil 43, the track coil 40 and the tilt coil 45 are supplied with a power, the bobbin 17 is actuated in the focusing direction F, the tracking direction T or the tilting direction t by interacting with the respective first to third magnets 20, 23 and 30 to implement focusing, tracking and tilting operation of the object lens 15.

Since the bobbin 17 is suspended by the suspension wire 35, the bobbin has vibration characteristics. Accordingly, the pickup actuator includes an open loop for a gain and a phase, in accordance with a frequency, so as to measure the vibration characteristics. Referring to FIG. 3A, depicting a common open loop, a frequency "a" corresponding to a 0 dB gain results in a cutoff frequency for 0 dB, with a point "P" representing a secondary resonant peak. A gain difference between 0 dB and the secondary resonant peak represents a gain margin GM.

As recording media recording/reproducing speeds have steadily increased, the operating frequencies have increased in focusing and tracking modes of optical pickups, in accordance with the speed, causing deflection and eccentricity of the recording media. Therefore, it has become necessary to overcome such problems raised by disturbances of an eccentric disc and a deflection disc and increased acceleration, so as to permit fast-speed optical recording media operations. In order to solve the above problems, the cutoff frequency for 0 dB has to be increased. To this end, the gain and phase are changed in an RF chip, a drive IC chip and a digital equalizer (EDQ). However, a secondary resonance is inevitably generated at a frequency of above 20 kHz, because of a physical structure of the optical pickup actuator, and a gain is remarkably increased in a range of the secondary resonant frequency. The gain in a secondary resonant peak may exceed 0 dB, which means the gain margin is 0.

On that occasion where the gain margin is decreased, if the secondary resonant frequency, and a certain disturbance having the secondary resonant frequency divided by n (wherein, n is 1, 2, 3, . . . ), are input into the optical recording device, there is high possibility that a disturbance will be produced in the optical recording device. Thus, the gain margin at the secondary resonant peak becomes one of the most important factors in designing a controller at the fast-speed drive of the optical recording medium, because of the possibility of such a disturbance.

A method of ensuring the gain margin includes one of converting the secondary resonant frequency into a high frequency and the other of reducing a size of the secondary resonant peak. FIG. 3B depicts the method of ensuring the gain margin by converting the secondary resonant frequency into a high frequency. The gain margin is increased from GM1 to GM2 (GM1<GM2) by increasing the secondary resonant frequency from c to d.

Meanwhile, the bobbin is therefore generally made of liquid crystalline polymer (LCP) having high stiffness to increase the secondary resonance frequency. In this case, the secondary resonant frequency can be increased because of the high stiffness. However, since the absorbing vibration capability is poor, due to a low logarithmic decrement or low internal lost value, many high-frequency vibrating modes are produced, thereby decreasing the gain margin. Therefore, a composite material is generally used, where the LCP material is mixed with flake or fiber-type reinforcement such as carbon.

Although the bobbin is made of a material having high stiffness, to suppress the high-frequency vibration mode, as well as to increase the secondary resonant frequency and thereby improving the gain margin, there are limited selections in available materials.

SUMMARY OF THE INVENTION

Embodiments of the present invention set forth a recording/reproducing apparatus and an optical pickup actuator, and methods of the same, where a size of a secondary resonant frequency is increased and a secondary resonant peak is decreased by improving a structure of a corresponding bobbin, so as to increase a gain margin and reduce a pliable vibration mode.

Additional aspects and/or advantages of the invention will be set forth in part in the description which follows and, in part, will be obvious from the description, or may be learned by practice of the invention.

To achieve the above and/or other aspects and advantages, embodiments of the present invention include a pickup actuator, including a bobbin with a plurality of slits, formed on side walls of the bobbin, increasing a stiffness of the bobbin, and a magnetic driver for driving the bobbin in a focusing direction, a tracking direction and/or a tilting direction.

The slits may be formed in a first direction on first opposing side walls of the bobbin, and the slits are formed in a direction perpendicular to the first direction on side walls adjacent to the first opposing side walls. Similarly, the slits may be formed in a horizontal direction on one side wall of the bobbin, and the slits are formed in a vertical direction on another side wall. The slits may further have rounded cross sections.

To achieve the above and/or other aspects and advantages, embodiments of the present invention include a recording and/or reproducing apparatus, including a pickup actuator according to an embodiment of the present invention and a controller controlling recording and/or reproducing of information to/from a medium and implementing focusing, tracking, and/or tilting control for the recording and/or reproducing of information by controlling operation of the pickup actuator.

To achieve the above and/or other aspects and advantages, embodiments of the present invention include a pickup actuator, including a bobbin with a plurality of slits, formed on side walls of the bobbin, increasing a stiffness of the bobbin, and a magnetic driver for driving the bobbin in a focusing direction, a tracking direction and/or a tilting direction, with the magnetic driver comprising a combined focusing/tilting magnetic driver and a separate tracking driver.

The combined focusing/tilting magnetic driver and the separate tracking driver may be positioned on one side of the bobbin. In addition, another combined focusing/tilting magnetic driver and another separate tracking driver may be positioned on an opposite side of the bobbin as the one side of the bobbin. Further, the combined focusing/tilting magnetic driver and/or the separate tracking driver may magnetically interact with two opposing polarizations of a multi-polarized magnet. Similar to above, the slits may have rounded cross sections.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
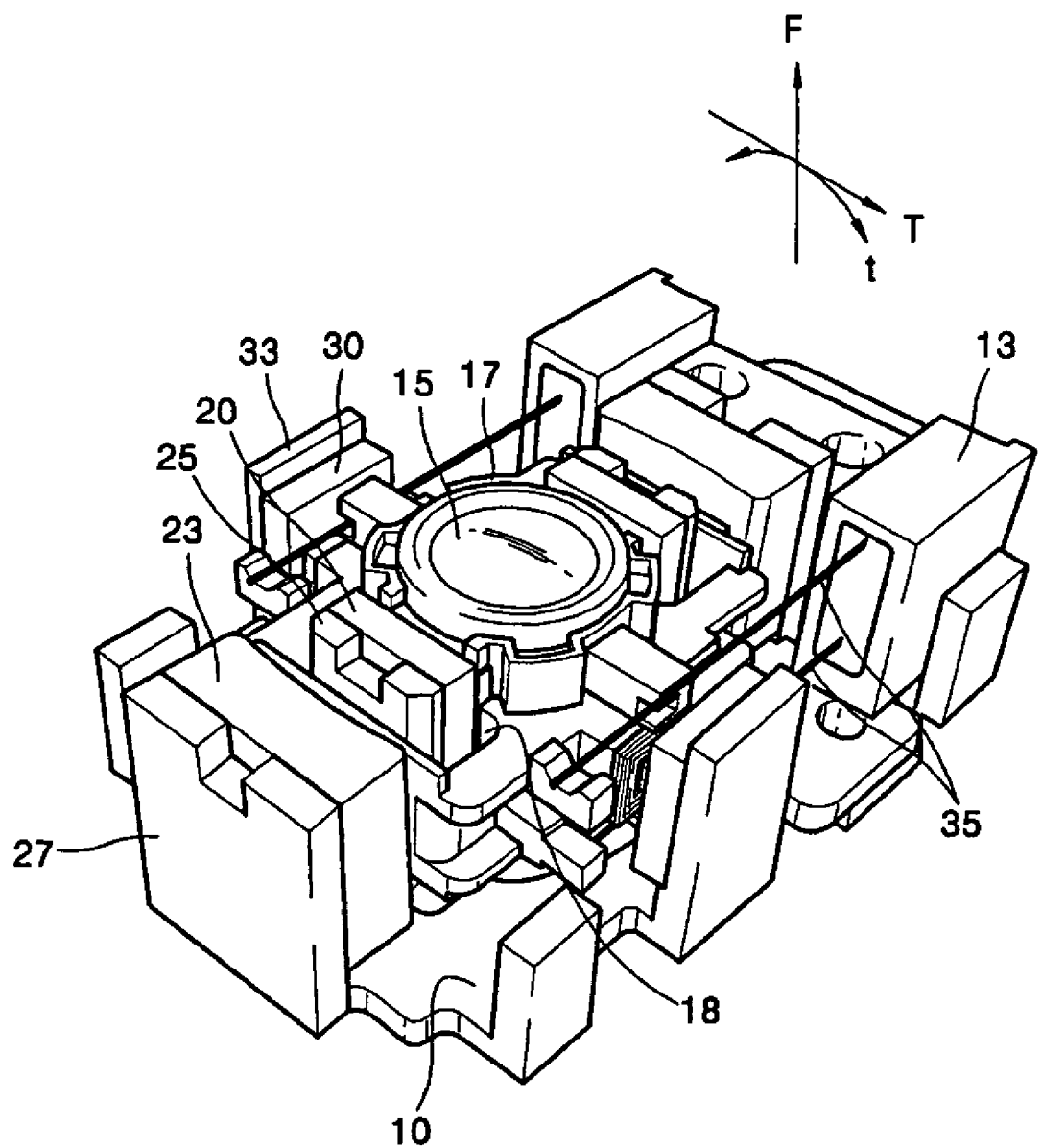
FIG. 1 illustrates a conventional optical pickup actuator.
Figure 2:
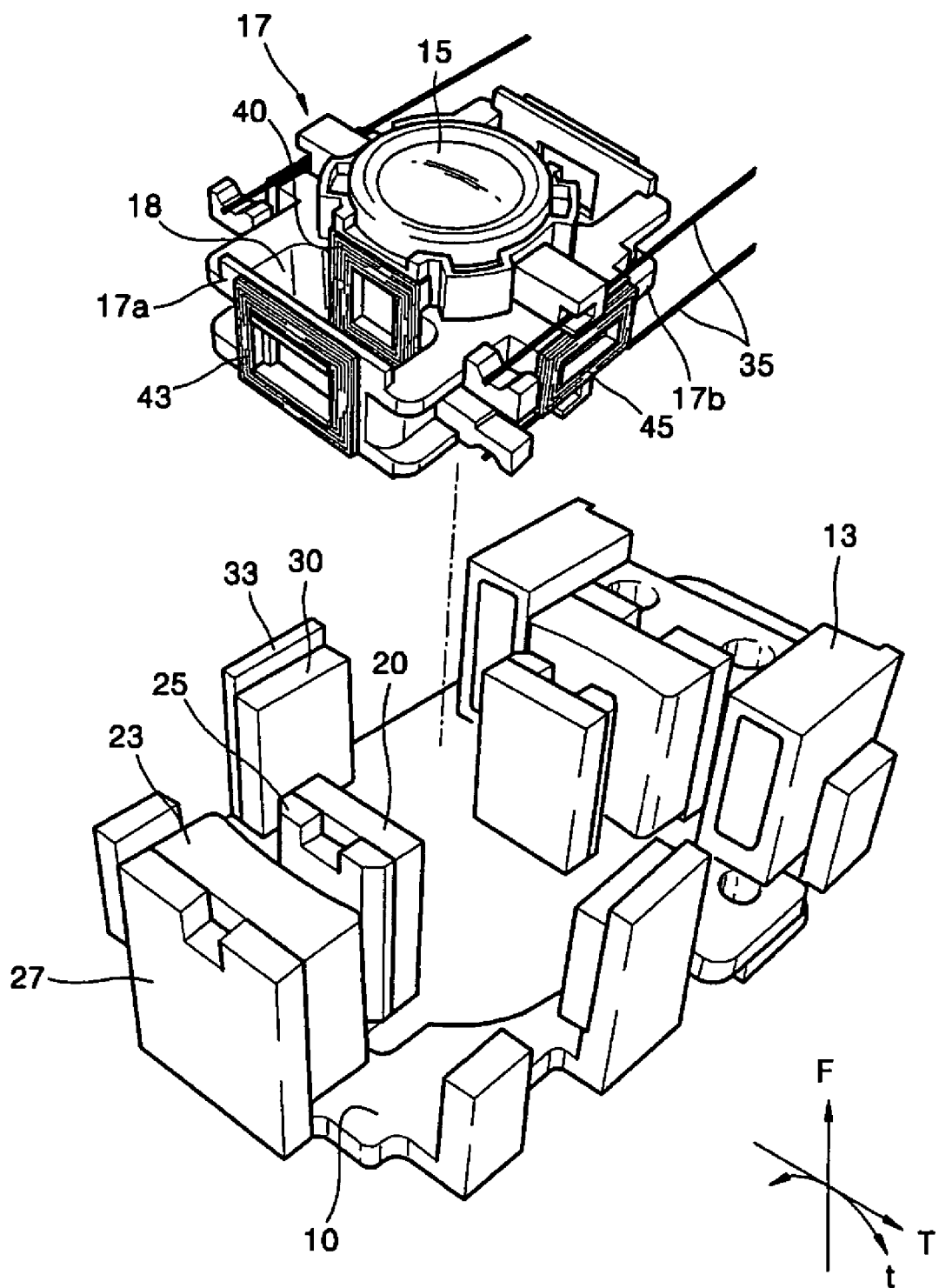
FIG. 2 illustrates an exploded perspective view of FIG. 1.
Figure 3A:
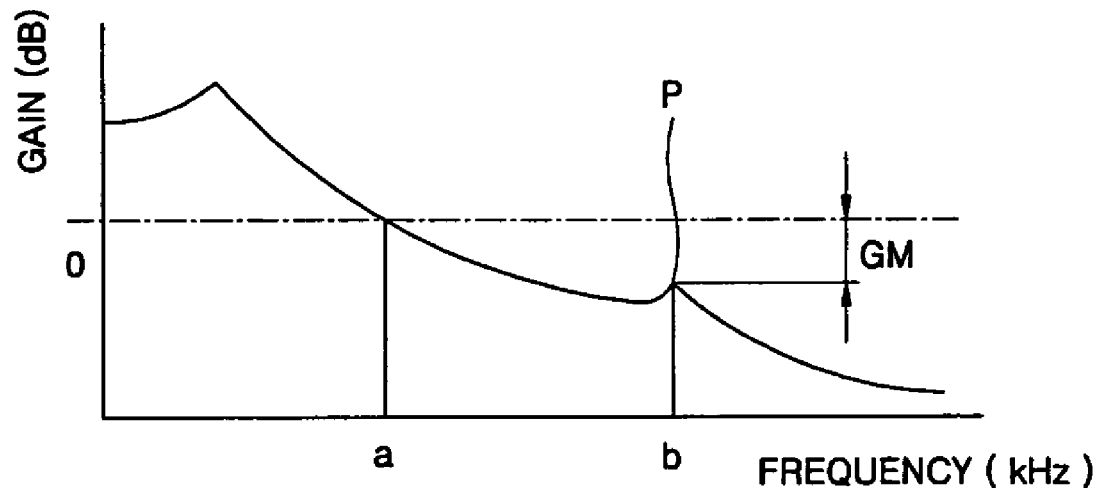
FIGS. 3A and 3B are graphs depicting a found interrelation between a gain and a frequency in the conventional optical pickup actuator.
Figure 3B:
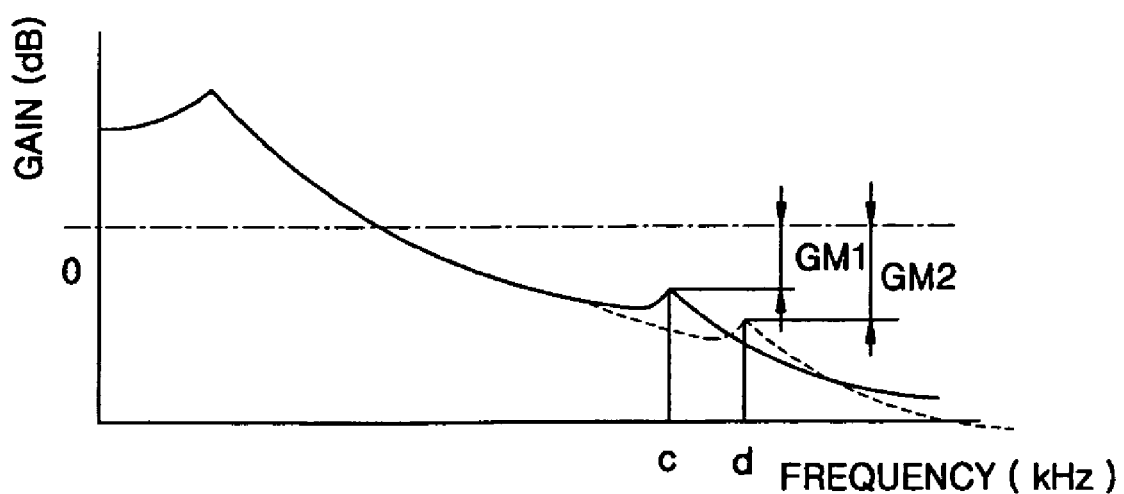

Reference will now be made in detail to the embodiments of the present invention, examples of which are illustrated in the accompanying drawings, wherein like reference numerals refer to the like elements throughout. The embodiments are described below to explain the present invention by referring to the figures.

Secondary resonant frequencies for a bobbin employed in an optical pickup actuator, of a recording/reproducing apparatus are affected by material, shape and tolerance of the bobbin. In embodiments of the present invention, the shape of the bobbin has been modified to have an increased stiffness, and thereby an increased secondary resonant frequency.

Figure 4:
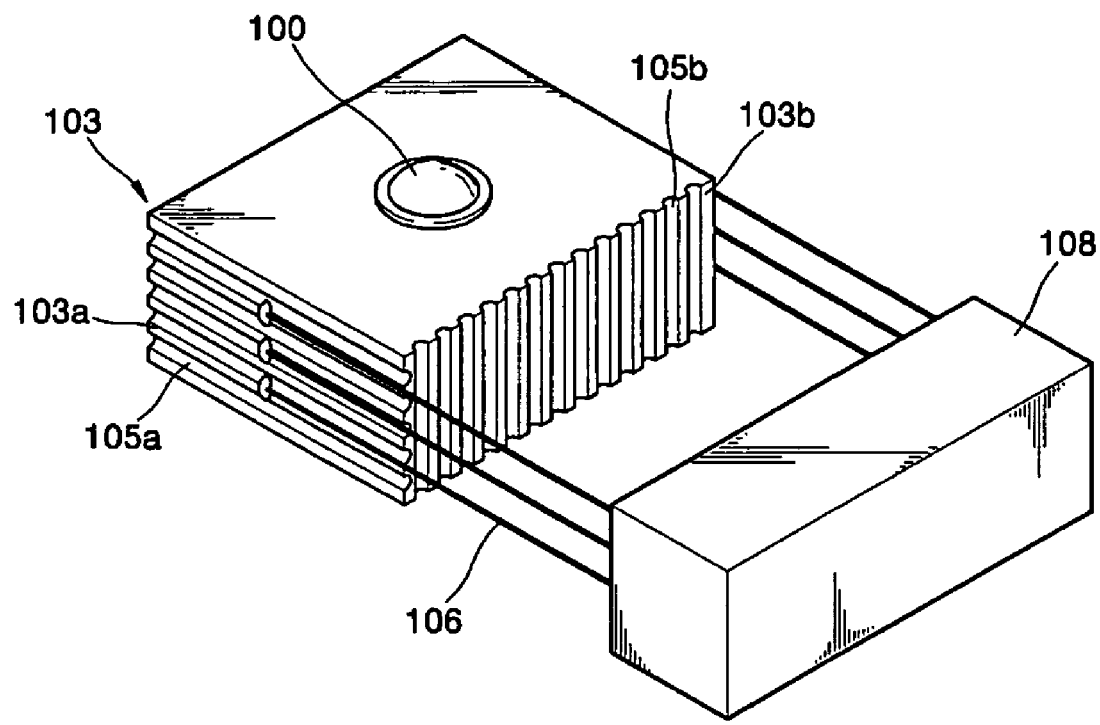
FIG. 4 illustrates a partially perspective view of an optical pickup actuator, according to an embodiment of the present invention.

Referring to FIG. 4, an optical pickup actuator embodiment of the present invention includes a bobbin 103 with an object lens 100. Side walls 103a and 103b of the bobbin 103 are provided with a plurality of slits 105, including slits 105a and 105b. One end of the bobbin 103 is secured to a holder 108, and the other end is suspended by a support member 106 coupled to the bobbin 103.

The slits 105 are formed in a horizontal and/or vertical direction on the side wall of the bobbin 103. Preferably, the slits 105a are formed in a horizontal direction on the side wall 103a of the bobbin 103, and the slits 105b are formed in a vertical direction on the side wall 103b.

Preferably, directions of the slits 105 are alternatively formed along the side walls of the bobbin 103. Specifically, the slits can be formed in the same direction on opposite side walls of the bobbin, while the slits are formed in a corresponding perpendicular direction on adjacent side walls of the bobbin. Therefore, a stiffness of the bobbin 103 can be effectively increased.

Figure 5:
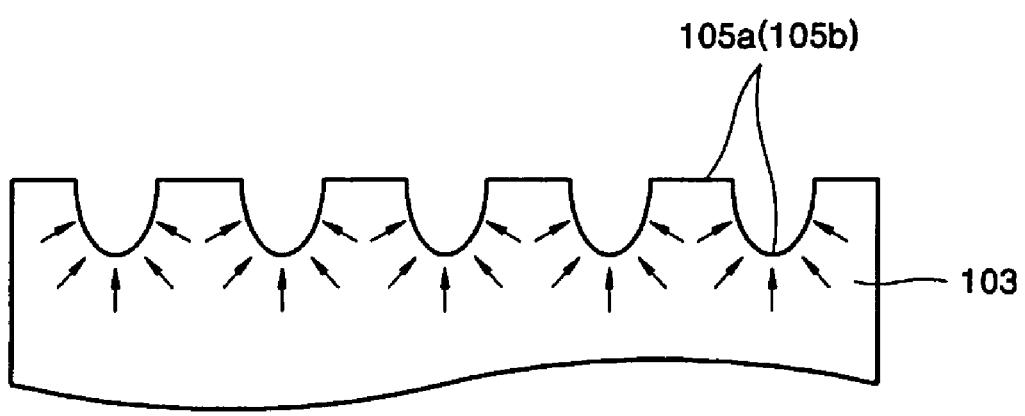
FIG. 5 illustrates a cross-sectional view of a bobbin of an optical pickup actuator, according to an embodiment of the present invention.

Referring to FIG. 5, the slits 105a and 105b can have a round cross section. If stress is concentrated on the slits, the stress can be distributed along the round cross section to increase the stiffness of the bobbin, which can thereby increase a secondary resonant frequency and reduce a value of a secondary resonant peak. Therefore, a gain margin of the bobbin can be further improved. The creation of the aforementioned high-frequency vibration mode is suppressed by the round cross section of the slit, reducing the value of the secondary resonant peak.

Figure 6:
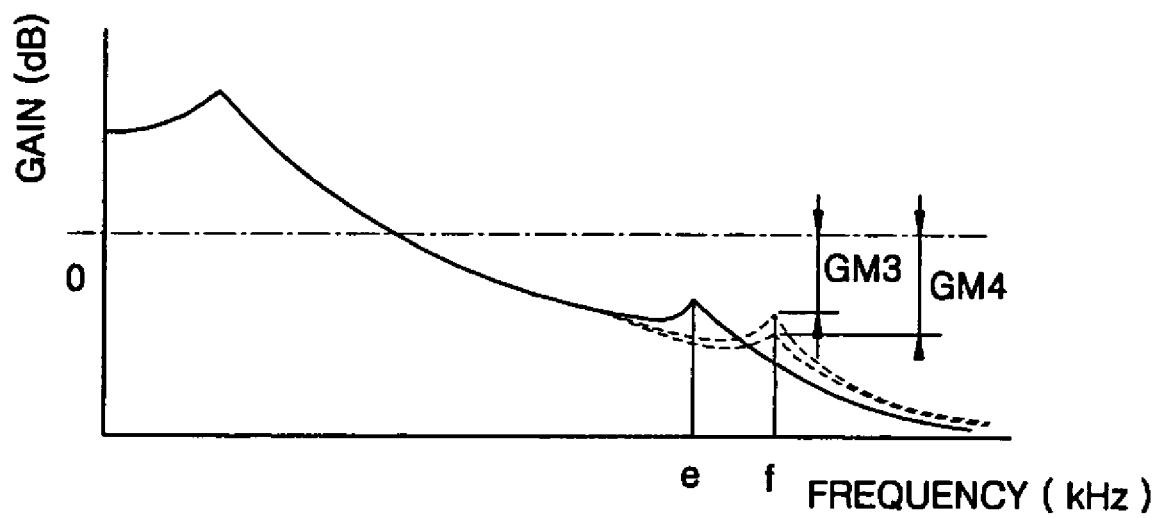
FIG. 6 is a graph depicting an interrelation between a gain and a frequency when a secondary resonant frequency is increased and a value of a secondary resonant peak is lowered, according to an embodiment of the present invention.

As shown in FIG. 6, when the secondary resonant frequency is increased from "e" to "f", and the value of the secondary resonant peak is lowered, the gain margin is thus improved. Since the slit has the round cross section, the value of the secondary resonant peak is lowered, and the gain margin is improved from "GM3" to "GM4."

The optical pickup actuator, according to an embodiment of the present invention will now be further described.

Figure 7:
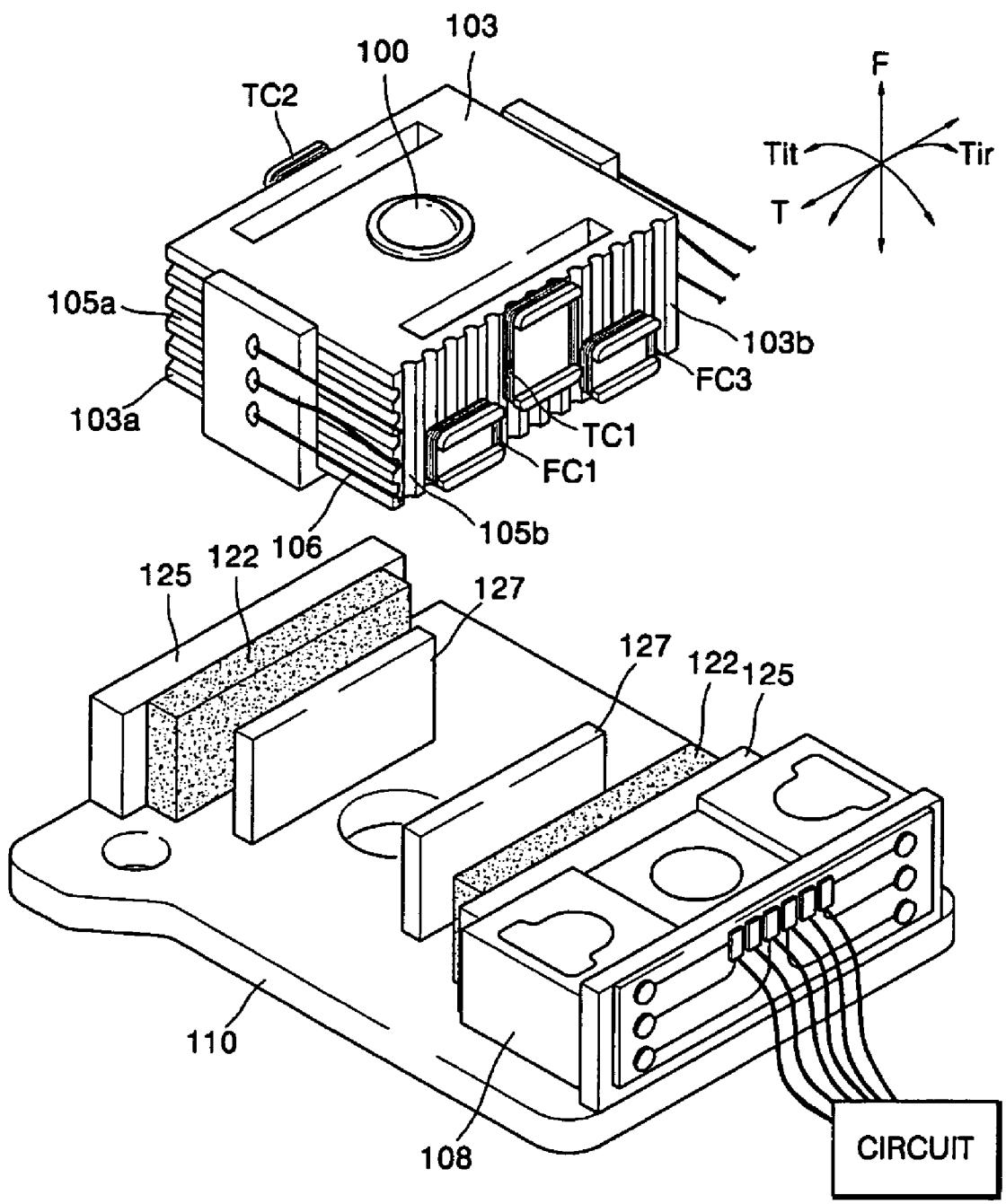
FIG. 7 illustrates an exploded perspective of an optical pickup actuator, according to an embodiment of the present invention.
Figure 8:
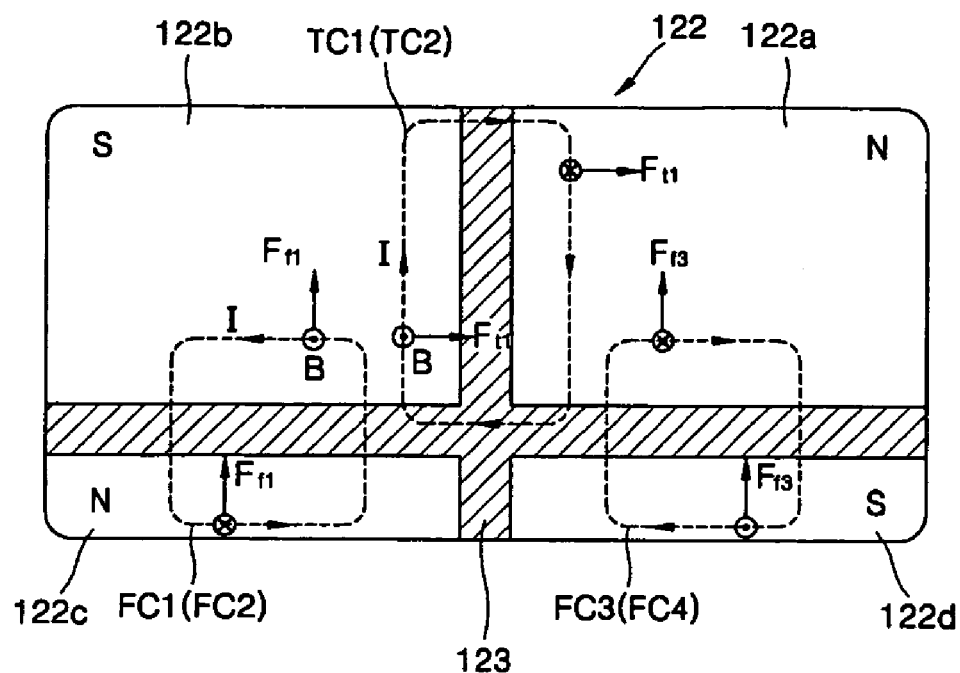
FIG. 8 illustrates a view depicting an arrangement of magnets and coils provided in the optical pickup actuator illustrated FIG. 7.

Referring to FIGS. 7 and 8, an optical pickup actuator according to this embodiment of the present invention includes a base 110, a holder 108, provided to one side of the base 110, a bobbin 103 mounted on the base 110, having an object lens 100, and a magnetic driving unit for driving the bobbin 103 in a focusing direction F, a tracking direction T, and a tilting directions Tit (tangential directional tilt) and Tir (radial directional tilt).

The bobbin 103 includes a plurality of slits 105a and 105b, with the slits 105a being perpendicular to the slits 105b, for example.

The magnetic driving unit includes at least one tilt/focus coil and tracking coil provided on both side walls 103b of the bobbin, and magnets 122 opposite to the tilt/focus coil and track coil. For example, the at least one tilt/focus coil may include a first, second, third and fourth tilt/focus coils, e.g., FC1, FC2, FC3 and FC 4 (shown in FIG. 8), and the track coil may include one coil TC1 on one side wall of the bobbin 103 and one coil TC2 on the other side wall of the bobbin 103. The first through fourth tilt/focus coils FC1 through FC4 and the track coils TC1 and TC2 are disposed on two side walls 103b of the bobbin 103, and a support member 106 is disposed on the remaining two sides 103a of the bobbin 103 to apply power to the first through fourth tilt/focus coils FC1 through FC4 and the track coils TC1 and TC2 and movably support the bobbin. The support member 106 may be a wire or leaf spring, for example.

With this construction, the first through fourth tilt/focus coils FC1 through FC4 are adapted to synchronously control the bobbin in a focus direction and a tilt focus direction.

The magnet 122 is formed in quadrant polarizations, as shown in FIG. 8. Specifically, the magnet 122 is divided into a quadrant such that N pole and S pole is properly distributed. For clarity, the magnet 122 can be divided into a first N polarization 122a, a second S polarization 122b, a third N polarization 122c, and a fourth S polarization 122d. The respective polarizations 122a, 122b, 122c and 122d of the magnet 122 can be disposed in correspondence to the tilt/focus tracks FC1 through FC4 and the track coils TC1 and TC2.

For example, the track coils TC1 and TC2 can be disposed opposite to the first and second polarizations 122a and 122b, with each pair of tilt/focus coils FC1 through FC4 being disposed to both side walls of the bobbin 103, to which the track coils TC1 and TC2 are disposed, so as to dispose opposite to the first and fourth polarizations 122a and 122d and at the same time opposite to the second and third polarizations 122b and 122c.

Meanwhile, the magnet 122 may be a surface polarization magnet of two polarizations. For example, a pair of surface polarized magnets having two polarizations may be disposed at a certain interval opposite to the tilt/focus coils FC1 through FC4 and the track coils TC1 and TC2.

The track/focus coils FC1 through FC4 and the track coils TC1 and TC2 may be a winding coil or a fine pattern coil, for example, and the fine pattern coil may be made by patterning of a certain material on a film, which may be effectively installed in a small space.

Although the magnet 122 may be made in quadrant polarizations, of which a surface area of the polarization is symmetrical to each other, the first and second polarizations 122a and 122b corresponding to the track coils TC1 and TC2 may have a surface area wider than that of the third and fourth polarizations 122c and 122d so as to obtain an effective surface area of the track coils TC1 and TC2. Specifically, the tilt/focus coils FC1 through FC4 may utilize the first through fourth polarizations 122a through 122d, while the track coils TC1 and TC2 may utilize the first and second polarizations 122a and 122b only. Therefore, the surface area of the polarization can be adjusted to balance the tilt/focus coils FC1 through FC4 and the track coils TC1 and TC2.

A neutral region 123 can be disposed between the polarizations 122a through 122d of the magnet 122. Since a magnetic flux is offset in a contact area of opposite poles, the neutral region 123 is provided at an interfacing point of the respective polarizations to prevent attenuation of magnetic force. FIG. 8 further illustrates respective potential $F_{f1}$, $F_{f3}$, and $F_{t1}$ forces generated from FC1 (FC2), FC3 (FC4), and TC1 (TC2).

The optical pickup actuator may also include an external yoke 125 and an internal yoke 127 so as to guide the magnetic flux generated from the magnet 122 toward a desired point.

According to the above optical pickup actuator embodiment of the present invention, the slits 105 can be provided at the side walls of the bobbin 103 to increase the secondary resonant frequency and thereby improve a gain margin of the optical pickup actuator. The embodiment shown in FIGS. 7 and 8 may be modified or altered without deviating from the present invention, and accordingly is not limited thereto.

Figure 9:
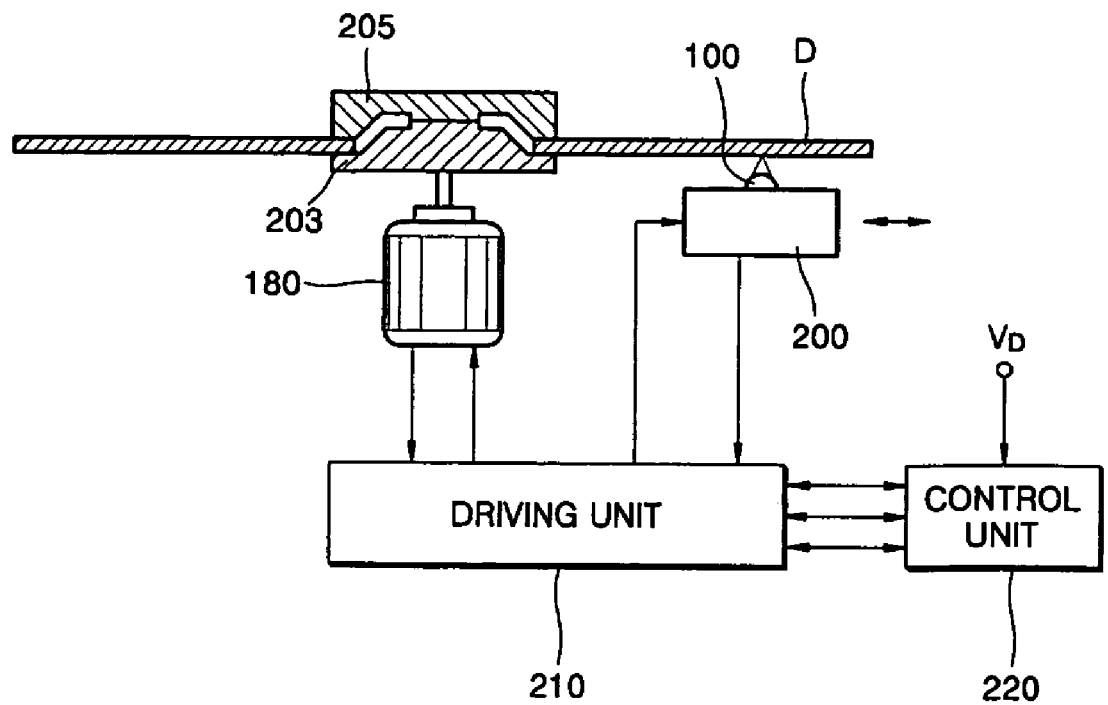
FIG. 9 illustrates an optical recording/reproducing apparatus employing an optical pickup actuator, according to an embodiment of the present invention.

Referring to FIG. 9, an optical recording/reproducing device, according to an embodiment of the present invention, may includes a turntable 203 with a disc D mounted thereon, a spindle motor 180 installed under the turntable 203 for rotating the disc D, and a clamp 205 installed opposite to the turntable 203 for chucking the disc D by use of an electromagnetic force generated from interrelation between the turntable and the clamp.

When the disc D is turned by the spindle motor 180, an optical pickup unit 200 is movable in a radial direction of the disc D for reproducing and/or recording information from/to the disc. The disc D may correspond to various discs having a different track pitch, for example.

The spindle motor 180 and the optical pickup unit 200 can be driven by a driving unit 210, and a focusing and tracking servo of the optical pickup unit 200 can be controlled by a control unit 200 to implement reproduction or recordation of information from/to the disc.

The optical pickup unit 200 includes an optical system having an object lens 100, and an optical pickup actuator for driving the object lens 100 in focus and track directions. The optical pickup actuator may include the bobbin 103 shown in FIG. 5, for example.

A signal detected by the optical pickup unit 200 is input into the control unit 200 through the driving unit 210. The driving unit 210 controls a rotational speed of the spindle motor 112, amplifies the input signal, and drives the optical pickup unit 200.

The control unit 220 sends a focusing servo command and a tracking servo command, which are adjusted based on a signal from the driving unit 210, to the driving unit to implement the focusing servo and the tracking servo. The optical pickup unit 200 radiates three beams commonly used for an information storing medium having a different track pitch, for example. The control unit 220 may then implement a tracking control of different information storing mediums by use of the signals of three beams.

As described above, according to the recording/reproducing apparatus and optical pickup actuator, and methods thereof, in embodiments of the present invention slits can be provided at a bobbin to increase the stiffness and thereby a secondary resonant frequency. Also, the slits may have a round cross section to decrease the value of the secondary resonant peak and thereby improve the gain margin. In addition, such an operation can incorporate a stability into the optical pickup actuator indispensably required to achieve fast speeds for the recording medium operations.

While embodiments of the present invention have been particularly shown and described with reference to exemplary embodiments depicted in the drawings, it will be understood by those of ordinary skill in the art that various changes and modifications in form and details may be made therein without departing from the spirit and scope of the present invention. Therefore, the true spirit and scope for protection of the present invention is defined by the following claims and their equivalents.

What is claimed is:

1. A pickup actuator, comprising:
   a bobbin with a plurality of slits, formed on exterior-side walls of the bobbin, increasing a stiffness of the bobbin; and
   a magnetic driver for driving the bobbin in a focusing direction, a tracking direction and/or a tilting direction.

2. The pickup actuator of claim 1, wherein the slits have rounded cross sections.

3. A recording and/or reproducing apparatus, comprising:
   the pickup actuator of claim 1; and
   a controller controlling recording and/or reproducing of information to/from a medium and implementing focusing, tracking, and/or tilting control for the recording and/or reproducing of information by controlling operation of the pickup actuator.

4. The pickup actuator of claim 1, wherein the plurality of slits comprise respective plural slits on each of the exterior side wall having silts.

5. A pickup actuator, comprising:
   a bobbin with a plurality of slits, formed on side walls of the bobbin, increasing a stiffness of the bobbin; and
   a magnetic driver for driving the bobbin in a focusing direction, a tracking direction and/or a tilting direction,
   wherein the slits are formed in a first direction on first opposing side walls of the bobbin, and the slits are formed in a direction perpendicular to the first direction on side walls adjacent to the first opposing side walls.

6. The pickup actuator of claim 5, wherein the slits have rounded cross sections.

7. A recording and/or reproducing apparatus, comprising:
   the pickup actuator of claim 5; and
   a controller controlling recording and/or reproducing of information to/from a medium and implementing focusing, tracking, and/or tilting control for the recording and/or reproducing of information by controlling operation of the pickup actuator.

8. A pickup actuator, comprising:
   a bobbin with a plurality of slits, formed on side walls of the bobbin, increasing a stiffness of the bobbin; and
   a magnetic driver for driving the bobbin in a focusing direction, a tracking direction and/or a tilting direction,
   wherein the slits are formed in a horizontal direction on one side wall of the bobbin, and the slits are formed in a vertical direction on another side wall.

9. A recording and/or reproducing apparatus, comprising:
   the pickup actuator of claim 8; and
   a controller controlling recording and/or reproducing of information to/from a medium and implementing focusing, tracking, and/or tiling control for the recording and/or reproducing of information by controlling operation of the pickup actuator.

10. A pickup actuator, comprising:
    a bobbin with a plurality of slits, formed on exterior side walls of the bobbin, increasing a stiffness of the bobbin; and
    a magnetic driver for driving the bobbin in a focusing direction, a tracking direction and/or a tilting direction, with the magnetic driver comprising a combined focusing/tilting magnetic driver and a separate tracking driver.

11. The pickup actuator of claim 10, wherein the combined focusing/tilting magnetic driver and the separate tracking driver are positioned on one side of the bobbin.

12. The pickup actuator of claim 11, further comprising another combined focusing/tilting magnetic driver and another separate tracking driver positioned on an opposite side of the bobbin as the one side of the bobbin.

13. The pickup actuator of claim 11, wherein the combined focusing/tilting magnetic driver and/or the separate tracking driver magnetically interact with two opposing polarizations of a multi-polarized magnet.

14. The pickup actuator of claim 10, wherein the slits have rounded cross sections.

15. A recording and/or reproducing apparatus, comprising:
    the pickup actuator of claim 10; and
    a controller controlling recording and/or reproducing of information to/from a medium and implementing focusing, tracking, and/or tilting control for the recording and/or reproducing of information by controlling operation of the pickup actuator.

16. The pickup actuator of claim 10, wherein the plurality of slits comprise respective plural slits on each of the exterior side mile having slits.

* * * * *

UNITED STATES PATENT AND TRADEMARK OFFICE
CERTIFICATE OF CORRECTION

PATENT NO. : 7,466,635 B2  Page 1 of 1
APPLICATION NO. : 11/033971
DATED : December 16, 2008
INVENTOR(S) : Won-ik Cho et al.

It is certified that error appears in the above-identified patent and that said Letters Patent is hereby corrected as shown below:

Column 7, Line 26, change "silts." to --slits.--.

Column 8, Line 10, change "tiling" to --tilting--.

Column 8, Line 45, change "mile" to --walls--.

Signed and Sealed this

Second Day of June, 2009

JOHN DOLL
*Acting Director of the United States Patent and Trademark Office*